United States Patent [19]

Yoda

[11] Patent Number: 4,833,662
[45] Date of Patent: May 23, 1989

[54] REPRODUCTION APPARATUS FOR A MAGNETO-OPTICAL RECORDING MEDIUM

[75] Inventor: Yoshiro Yoda, Tokyo, Japan

[73] Assignee: Olympus Optical Co., Ltd., Tokyo, Japan

[21] Appl. No.: 854,197

[22] Filed: Apr. 21, 1986

[30] Foreign Application Priority Data

May 2, 1985 [JP] Japan .................................. 60-95770
May 2, 1985 [JP] Japan .................................. 60-95771

[51] Int. Cl.$^4$ ...................... G11B 13/04; G11B 20/24
[52] U.S. Cl. ..................... 369/13; 369/124; 369/128; 369/54; 369/110; 360/114
[58] Field of Search ............... 369/13, 14, 109, 124, 369/134, 128, 76, 46, 110, 47, 48, 49, 54, 292; 360/114, 59; 365/122

[56] References Cited

U.S. PATENT DOCUMENTS

| | | | |
|---|---|---|---|
| 4,169,219 | 9/1979 | Beard | 369/124 |
| 4,417,290 | 11/1983 | Tanaka et al. | 369/14 |
| 4,472,748 | 9/1984 | Kato et al. | 360/114 |
| 4,587,644 | 5/1986 | Fujiie | 369/46 |
| 4,663,751 | 5/1987 | Kaku et al. | 369/109 |

FOREIGN PATENT DOCUMENTS

| | | | |
|---|---|---|---|
| 60-160082 | 8/1985 | Japan | 369/292 |
| 2133914 | 8/1984 | United Kingdom . | |

OTHER PUBLICATIONS

Denshi Tsushin Gakkai, Gijutsu Kenkyu Hokoku, vol. 83, No. 197, Nov. 25, 1983.

*Primary Examiner*—Alan Faber
*Assistant Examiner*—Hoa T. Nguyen
*Attorney, Agent, or Firm*—Frishauf, Holtz, Goodman & Woodward

[57] ABSTRACT

A reproduction apparatus for an optical magnetic disk having data recorded in a magneto-optical recording form and an address recorded in an optical recording form, includes a pickup for detecting P- and S-axis components of a linearly polarized laser beam reflected on an optical magnetic disk, an adder for adding the P- and S-axis components, and a subtracter for subtracting the S-axis component from the P-axis component. A reproduction signal processing circuit confines an output of the adder and that of the subtracter to produce a reproduction signal. A comparator converts the reproduction signal into a binary signal, the reproduction signal processing circuit including a circuit for identifying whether a reproduction signal is one of magneto-optical recording information or one of optical recording information. A variable gain amplifier amplifies the subtraction signal of the P- and S-axis components, at an amplification factor corresponding to a result of identification, in which the reproduction signal of optical recording information has a greater amplification factor than the amplification factor of the reproduction signal for magneto-optical recording information.

8 Claims, 10 Drawing Sheets (SIGNAL a)
(PRIOR ART)

(SIGNAL b)
(PRIOR ART)

(SIGNAL c)
(PRIOR ART)

(SIGNAL d)
(PRIOR ART)

(SIGNAL e)
(PRIOR ART)

(SIGNAL a)

(SIGNAL b)

(SIGNAL c)

(SIGNAL d)

(SIGNAL f)

(SIGNAL g)

(SIGNAL h)

F I G. 11A
(SIGNAL a)
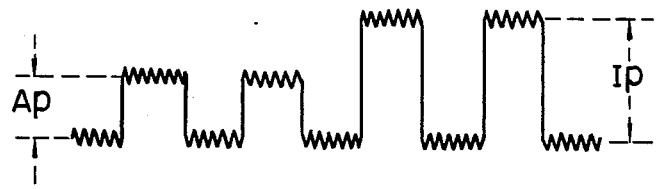
F I G. 11B
(SIGNAL b)
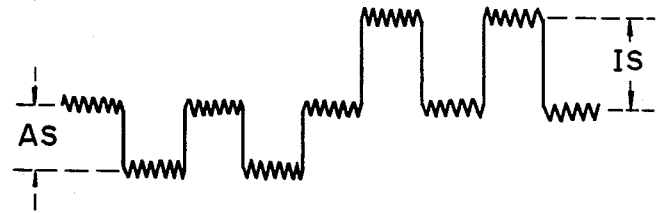
F I G. 11C
(SIGNAL c)
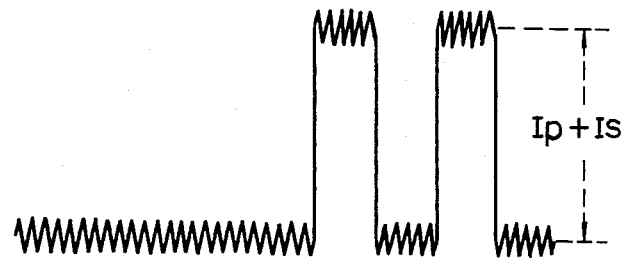
F I G. 11D
(SIGNAL d)
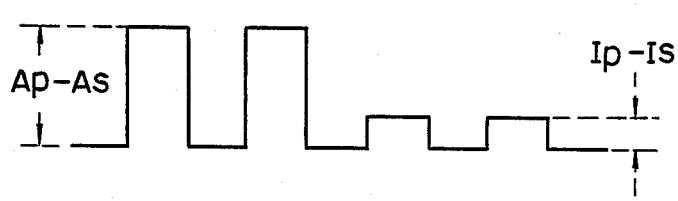
F I G. 11E
(SIGNAL f)
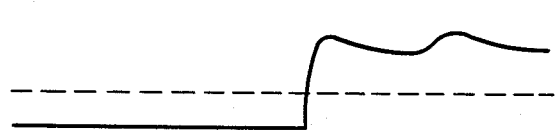
F I G. 11F
(SIGNAL g)
F I G. 11G
(SIGNAL h2)
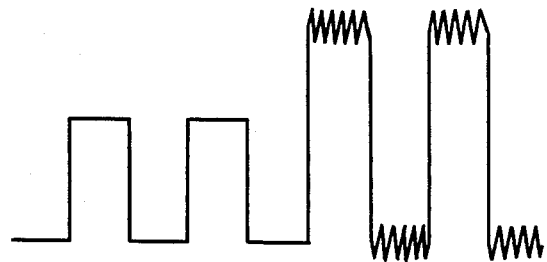

F I G. 12
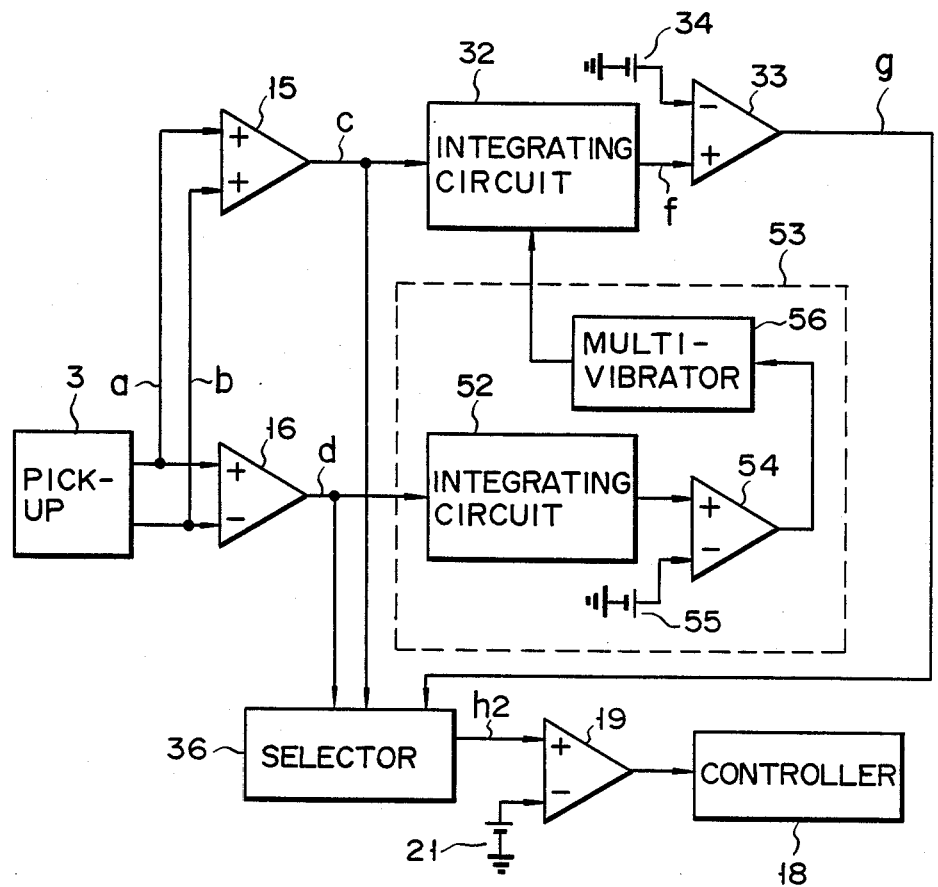

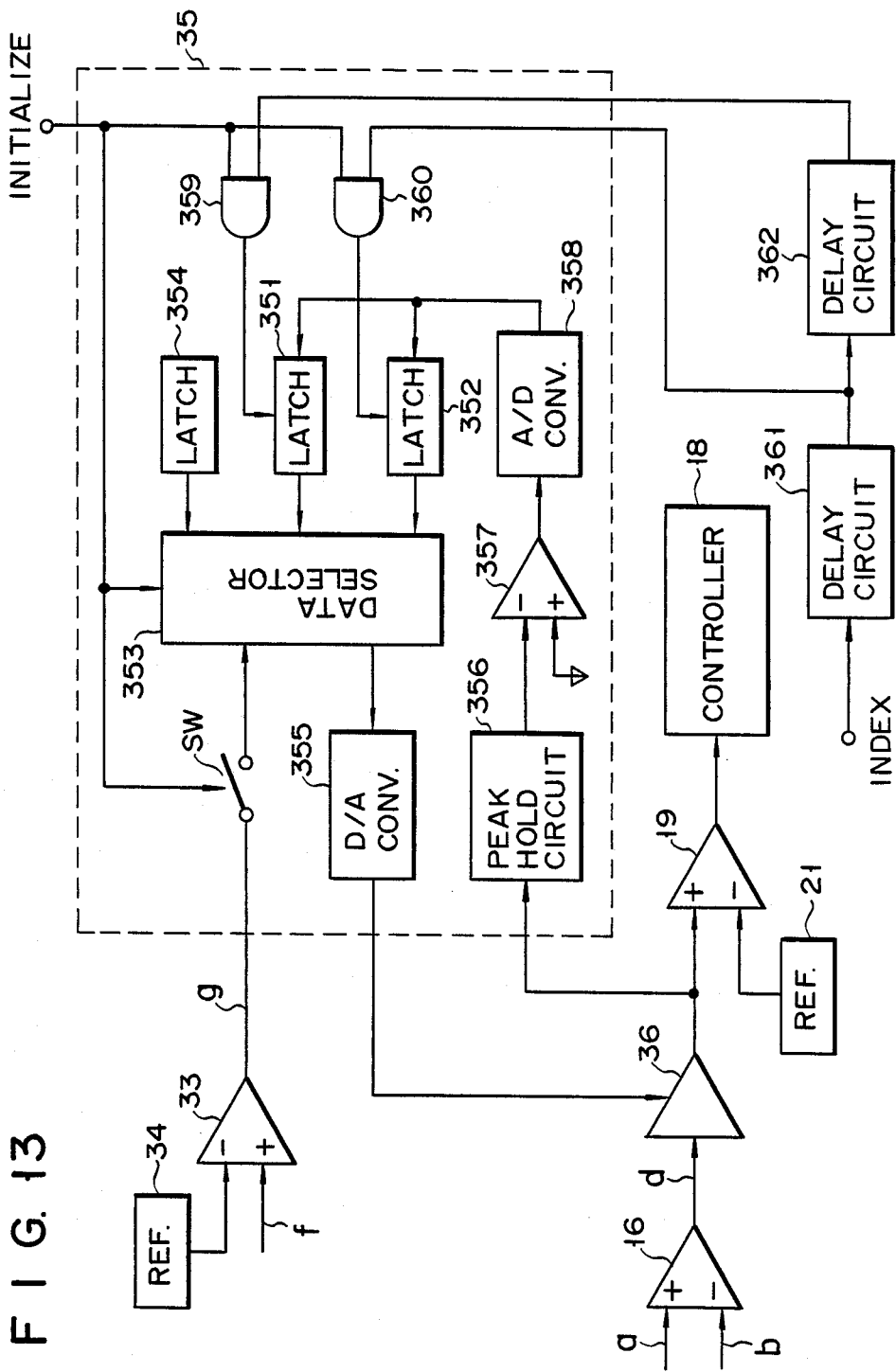
F I G. 13

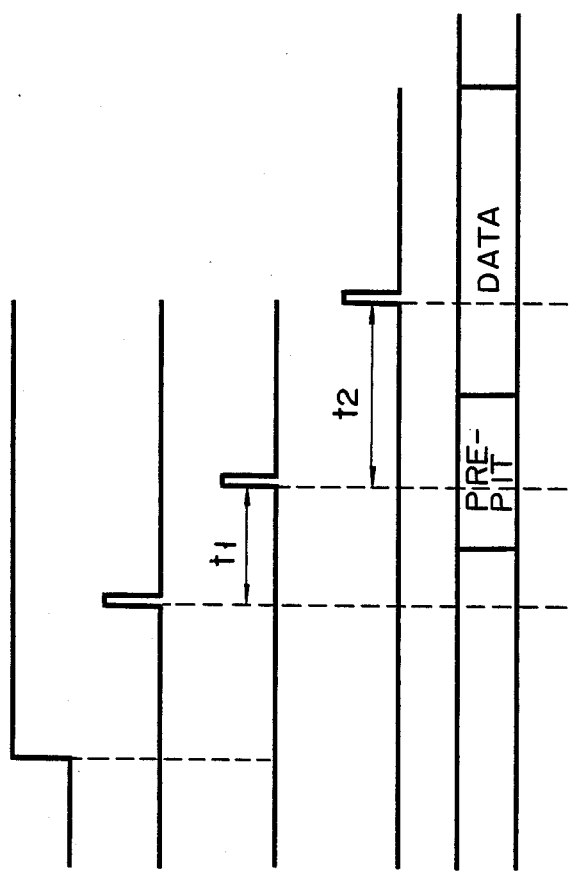

REPRODUCTION APPARATUS FOR A MAGNETO-OPTICAL RECORDING MEDIUM

BACKGROUND OF THE INVENTION

This invention relates to a reproduction apparatus for a magneto-optical recording medium.

Recently a magneto-optical recording system has been developed which utilizes a magneto-optical effect, such as a Kerr effect and Faraday effect. In this recording system a recording is performed on a recording medium of magnetic material in a direction perpendicular to its plane through a magnetization in a sense corresponding to recording information. On reproduction a laser light beam (a linearly polarized light beam) is directed to a disk where it is reflected. Since the oscillation plane of the reflected light beam is rotated, in a mutually opposite direction, by a corresponding angle in accordance with that magnetization direction, the recording information can be read out by detecting the rotation angle of the oscillation plane of the reflection light.

In this case, the recording operation can be performed relatively easily, but the reproducing operation cannot. Since the rotation angle of the oscillation plane is very small, i.e., of the order of $\pm 0.3°$ (a difference of $0.6°$), it is difficult to detect the rotation angle with high accuracy. For example, the S/N ratio is lowered by noise components resulting from the non-uniformity of a disk substrate and of a magnetic film of the disk. It would, therefore, be difficult to perform a reproduction without involving any erroneous recording information.

"Technical Research Report" vol. 83 No. 197, 1983 of "The Institute of Electronics and Communication Engineers of Japan" discloses "magneto-optical disk system to file memory" which is a conventional reproducing apparatus for a magneto-optical recording medium. FIG. 1 is a block diagram showing a summary of a conventional optical system. Optical pickup 3 is located opposite to one face of magneto-optical disk 2, made of a magnetic material, which is rotated by spindle motor 1. Pickup 3 is disposed on carriage 4 which in turn can be moved by an α belt, voice coil motor, etc. in a radial direction of disk 2 to permit a tracking or track access.

Laser diode 5 as a monochromatic light source is held within pickup 3. A P- or S-polarization laser beam (linearly polarized wave) from laser diode 5, after being transformed by collimator lens 6 into a parallel beam, is directed to shaping prism 7 where it is transformed into a circular beam. The resultant beam is directed through beam splitter 8 to object lens 9 where it is projected as a spot beam on one face of disk 2. Field coil 10 is located on the side of the other face of disk 2 in such a manner as to be opposed to pickup 3. Upon erasure and recording, a magnetic field is generated in a predetermined direction whereas, upon reproduction, the magnetic field is reversed in its direction by inverting the direction of the current flowing through coil 10. Magnetic coil 10 can be moved in the direction of the diameter of disk 2 as in the case of carriage 4.

Information is recorded with a corresponding magnetization occurring in the direction perpendicular to the face of disk 2. Depending upon whether a magnetization direction is upward or downward, the oscillation plane of the reflective laser beam is rotated by an angle $\pm \theta$ (a tiny angle) due to the Kerr effect. The reflective beam, after passing through object lens 9, falls on beam splitter 8 where part of the beam is reflected and directed to $\lambda/2$ plate 11. The $\lambda/2$ plate 11 is so designed as to permit the oscillation plane of the reflective beam (in the absence of any rotation due to the Kerr effect) to be oriented in an angular direction of 45°, i.e., in a position intermediate between P- and S-axes of the polarized beam splitter.

When a laser beam illuminates an information recording section, the intensity vector of that reflective beam which is incident onto beam splitter 12 is oriented in an angular direction of $45° \pm \theta$, i.e., in a position intermediate between the S-axis and P-axis as at $A_+$ and $A_-$ in FIG. 2, depending upon whether or not the illuminated portion of disk 2 is magnetized upwardly or downwardly. If polarized beam splitter 12, serving as an analyzer, is so designed as to permit a P-axis component to be passed and an S-axis component of the reflective beam to be reflected, then the P- and S-axis components of the reflective beam are received by PIN diodes 13a and 13b, respectively.

When disk 2 is rotated by spindle motor 1 and the magnetized direction of the information recording section of disk 2 is reversed in accordance with the recording information, then an amplitude-modulated beam with a difference (Ap in FIG. 2) between P-axis components of light intensity vectors $A_+$ and $A_-$ as an amplitude is incident onto photodiode 13a and an amplitude-modulated beam with a difference (As in FIG. 2) between S-axis components of light intensity vectors $A_+$ and $A_-$ as an amplitude is incident onto photodiode 13b. A photoelectric conversion signal a having a pulse amplitude Ap as indicated by a leading half of that pulse train in FIG. 3A is delivered from photodiode 13a and a photoelectric conversion signal b having a pulse amplitude As as indicated by a leading half of that pulse train in FIG. 3B is delivered from photodiode 13b. Since, as set forth above, the oscillation plane of the reflective beam (in the absence of any rotation due to the Kerr effect) is rotated by $\lambda/2$ plate 11 in the angular direction of 45°, i.e., in the position intermediate between the S- and P-axes of polarized beam splitter 12, photoelectric conversion signals a and b have the same pulse amplitudes (Ap, As).

In general, when an amount of laser beam from laser diode 5 varies, noises are contained in the photoelectric conversion signals a and b as shown in FIGS. 3A and 3B. Since, however, the noises contained in the photoelectric conversion signals a and b of the P- and S-axis components are in phase with each other and the pulses contained in the signals a and b have equal amplitudes Ap and As, but opposite phases with respect to each other, then those noises contained in the signals a and b can be eliminated by a differential circuit shown in FIG. 4.

That is, the signals a and b which are output from pickup 3 are input to adder 15 and subtracter 16. Since the pulses contained in the signals a and b are opposite in phase to each other, adder 15 produces a signal c with the amplitudes Ap and As canceled with respect to each other as shown in FIG. 3C. Since the noises contained in the signals a and b are in phase with each other, the output signal c of adder 15 contains a noise having double that amplitude as shown in FIG. 3C. On the other hand, an output signal d of subtracter 16 contains a pulse with the amplitudes Ap and As added together and contains almost no noise as shown in FIG. 3D.

If information is only magneto-optically recorded on magneto-optical disk 2, no problem arises therefrom. In practice, information may sometimes be only optically recorded on optical disk 2. Generally, it is necessary that a track number and sector number be initially recorded on optical disk 2. These address information items are often recorded in the form of uneven information pits (pits are press-worked using a female mold in a stamper) in order to mass-produce disks. The information pit is hereinafter referred to as a pre-pit. Depending upon whether or not there is a pit on the disk, the reflectivity varies. In the conventional magneto-optical disk, ordinary recording information is recorded by a magneto-optical recording method and address information is recorded by an optical recording method. In practice, various information items are often mixed on the magneto-optical disk and recorded by both the magneto-optical method and optical recording method.

Such address information items in the form of pre-pits are comprised of only the intensity-modulated components which vary in the intensity of the reflective beam, depending upon the presence or absence of pits. The oscillation plane of the reflective beam does not vary (rotate). The intensity vector of the beam reflected from a pre-pit section is represented by $I_1$, $I_0$ in FIG. 2, due to the presence or absence of the pit. In this case, the magnetization direction of the pre-pit is upward and thus the direction of the vectors $I_0$ and $I_1$ is in agreement with that of the vector $A_+$. When the pre-pit section on the disk is being read out, the output signals of photodiodes 13a and 13b appear one as a pulse with an amplitude, as shown in FIG. 3A, corresponding to an amplitude difference (Ip in FIG. 2) between the light intensity vector components $I_1$ and $I_0$ on the P-axis, and one as a pulse with an amplitude, as shown in FIG. 3B, corresponding to an amplitude difference (Is in FIG. 2) between the light intensity vector components $I_1$ and $I_0$ on the S-axis.

The reproduction signals a and b are in phase with each other upon reading the pre-pits on the disk. Since Ip>Is, the pulse contained in the reproduction signal from the corresponding pre-pit section on the disk is output from adder 15 as a pulse c of a greater amplitude Ip+Is, as shown in FIG. 3C and from subtracter 16 as a pulse d of a smaller amplitude Ip−Is, as shown in FIG. 3D.

The pulse d is free from noises and much smaller in amplitude when the pre-pit section is read out than when the ordinary information recording section is read out. It is necessary that the information read out of disk 2 be sent, irrespective of being address information or recording information, to a conventional controller 18 on a common data line. Details of the controller 18 are well known, and do not form a part of the present invention. The use of a separate signal processing system results in a bulkier circuit arrangement. For this reason, the signal d cannot be directly supplied to a bi-level quantization circuit. In the circuit arrangement shown in FIG. 4 adder 17 adds together the signals c and d to produce a signal e as shown in FIG. 3E, and the signal e is supplied to one input terminal of comparator 19 through a signal processor circuit 100 comprised of a low-pass filter, waveform equalizing circuit, automatic gain controller etc., while a reference signal from reference signal generator 21 is supplied to the other input terminal of comparator 19, to produce a bi-level signal for delivery to controller 18.

Since, however, the signal c of adder 15 contains doubly amplified noises, the binary output so obtained involves a degeneration of the S/N ratio which is gained from the output signal d of subtracter 16.

The aforementioned problem can be solved by adding together the output signals of adder 15 and subtracter 16 after having been converted to a bi-level signal. Two signal processor circuits are required for, for example, a low-pass filter, waveform equalizing circuit and automatic gain control circuit, thus producing a cost problem. Furthermore, an error is produced due to noises contained in data from the pre-pit section when the data from the data recording section is converted to a bi-level signal. Conversely, an error is produced due to noises contained in data from the data recording section when the data from the pre-pit section is converted to a binary representation.

SUMMARY OF THE INVENTION

It is accordingly an object of this invention to provide a reproduction apparatus for a magneto-optical recording medium which can reproduce information with a higher S/N ratio even if a reproduction signal of magneto-optical recording information, and a reproduction signal of other recording information are processed on a common signal processing circuit.

This object of this invention ca be achieved by a reproduction apparatus for a magneto-optical recording medium, which comprises a device for identifying whether a reproduction signal on the magneto-optical recording medium is derived from a magneto-optical recording information or from the other recording information, and a signal processing device which, as a result of identification, makes a gain of the reproduction signal variable or switches one of two signal processing systems over to the other.

BRIEF DESCRIPTION OF THE DRAWINGS

FIGS. 11A through 11G are signal waveform diagrams showing an operation of the second embodiment;

FIG. 12 is a block diagram showing a signal processing circuit for a magneto-optical recording medium according to a third embodiment of this invention;

FIG. 13 is a block diagram showing a signal processing circuit in a reproduction apparatus for a magneto-optical recording medium according to a fourth embodiment of this invention; and FIGS. 14A through 14E are signal waveforms showing the operation of the fourth embodiment.

DETAILED DESCRIPTION OF THE PREFERRED EMBODIMENTS

A reproduction apparatus according to a first embodiment of this invention will be explained below with respect to the accompanying drawings.

Figure 1:
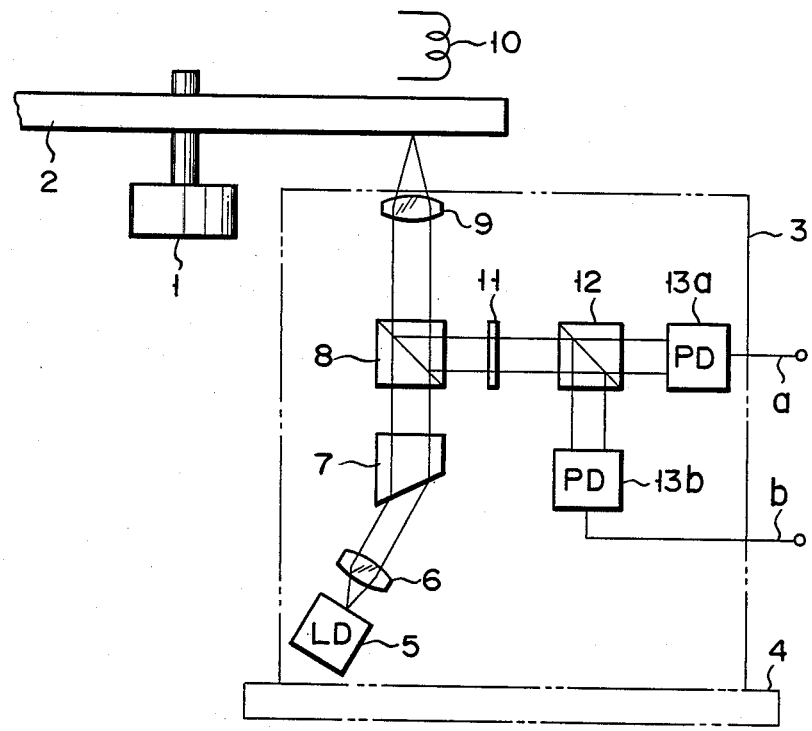
FIG. 1 is a block diagram showing a general arrangement of a conventional optical system in a reproduction apparatus for a magneto-optical recording medium.
Figure 2:
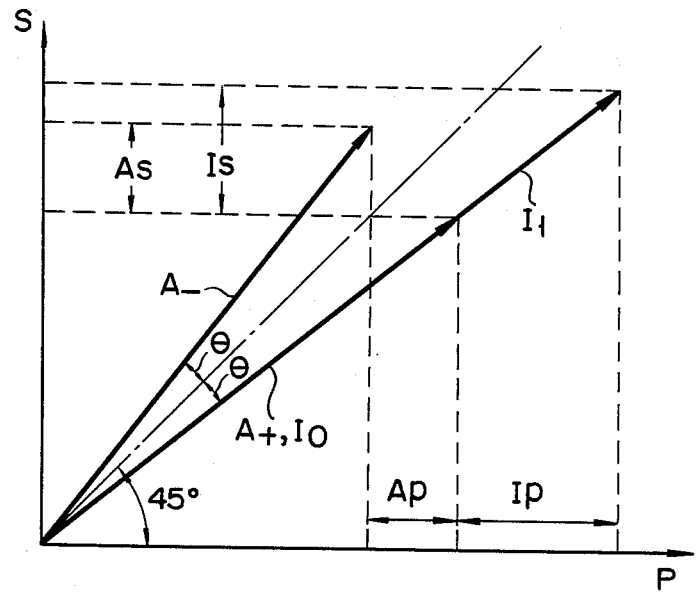
FIG. 2 is a known vector diagram showing a laser beam intensity of a reproduction signal.
Figure 3A:
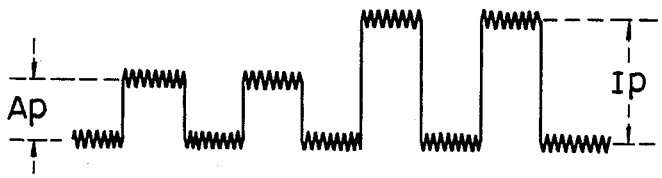
FIGS. 3A through 3E are signal waveforms showing a known signal processing operation on a reproduction signal.
Figure 3B:
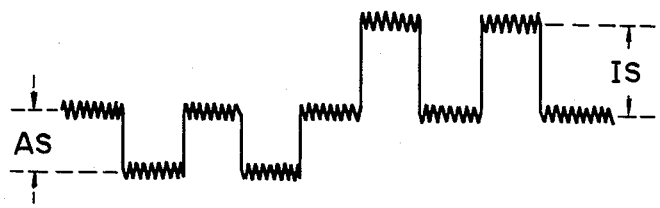
Figure 3C:
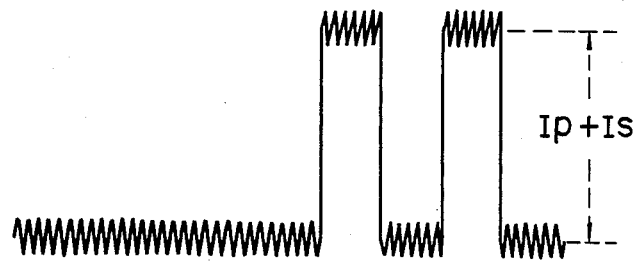
Figure 3D:
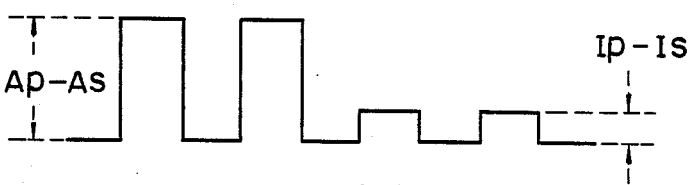
Figure 3E:
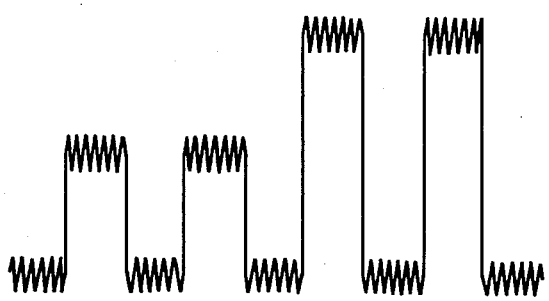
Figure 4:
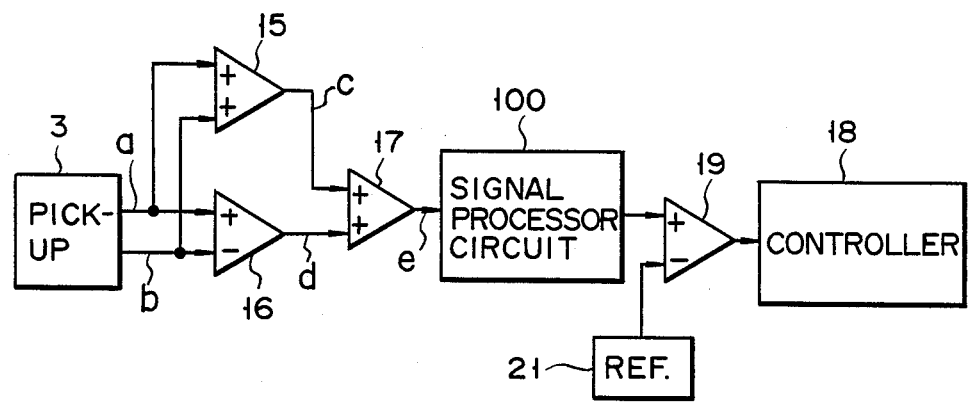
FIG. 4 is a block diagram showing a known signal processing circuit for the reproduction signal.
Figure 5:
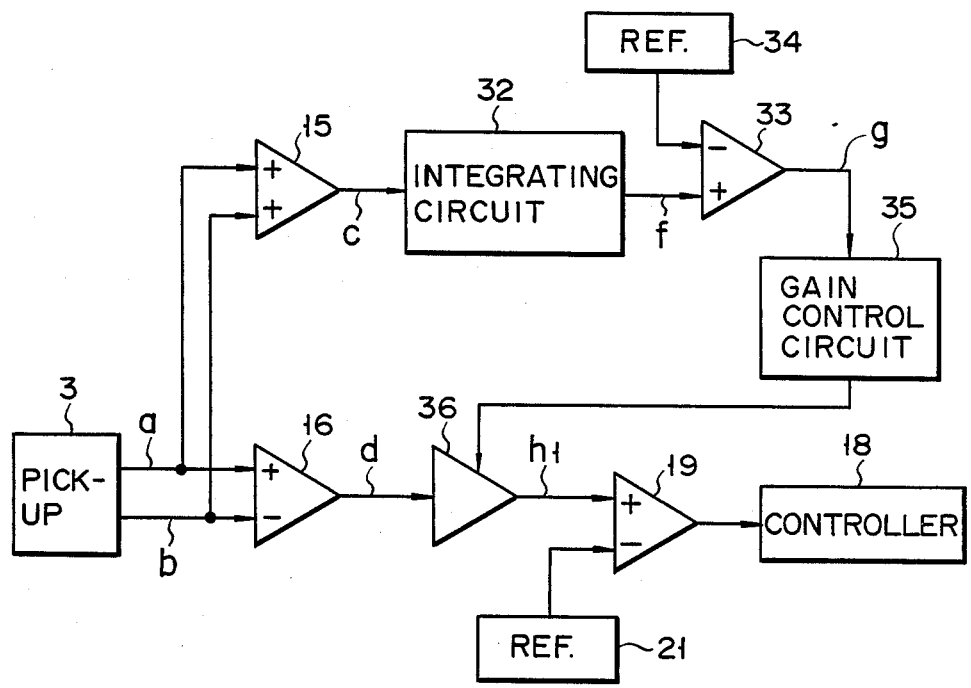
FIG. 5 is a block diagram showing a signal processing circuit in a reproduction apparatus for a magneto-optical recording medium according to one embodiment of this invention.

FIG. 5 is a block diagram showing an arrangement of a signal processing circuit. An optical system of this embodiment is the same as a conventional optical system of FIG. 1 and any further explanation of this system is omitted. In a signal processing circuit identical reference numerals are employed in FIG. 5 to designate parts or elements corresponding to those shown in FIG. 4. Although in the conventional arrangement a result of addition of an output c of adder 15 and output d of subtracter 16 are supplied to bi-level quantization circuit 19, in the first embodiment only an output d of subtracter 16 is supplied through variable gain amplifier 36 to bi-level quantization circuit 19 and an output c of adder 15 is supplied through integrating circuit 32 to a (+) input terminal of bi-level quantization circuit or comparator 33. A reference signal from reference generator 34 is supplied to a (−) input terminal of bi-level quantization circuit 33. An output g of bi-level quantization circuit 33 is supplied to gain control circuit 35. The gain of variable gain amplifier 36 is controlled by a control signal supplied to a control terminal thereof.

Figure 6:
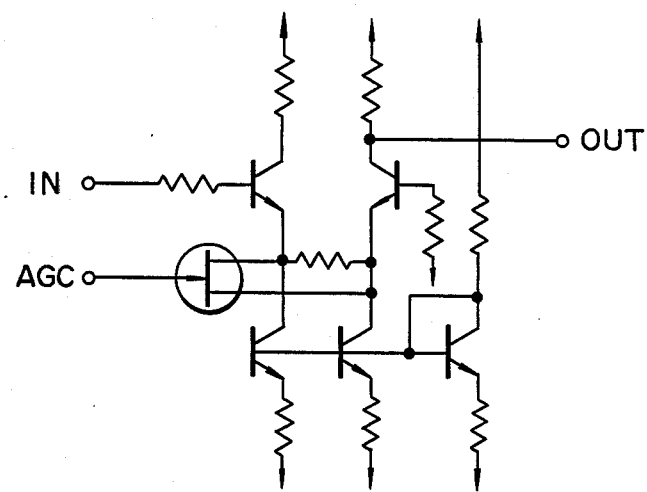
FIG. 6 is a detailed circuit diagram of a variable gain amplifier in FIG. 5.

The detailed circuit diagram of amplifier 36 is shown in FIG. 6. The terminals IN, OUT and AGC are respectively connected to the output terminal of subtracter 16, (+) input terminal of subtracter 19 and output terminal of gain control circuit 35.

Figure 7:
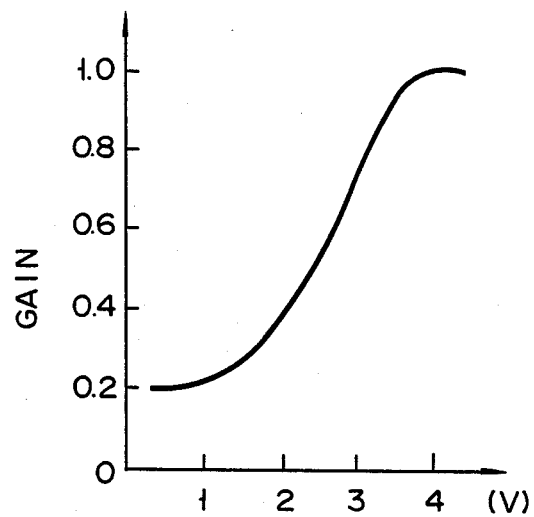
FIG. 7 is a view showing the characteristic of a variable gain amplifier of FIG. 5.

Gain variable amplifier 36 has a characteristic as shown in FIG. 7 so that a relative gain varies in accordance with a control voltage.

An output h1 of variable gain amplifier 36 is supplied to controller 18 through bi-level quantization circuit 19.

Figure 8A:
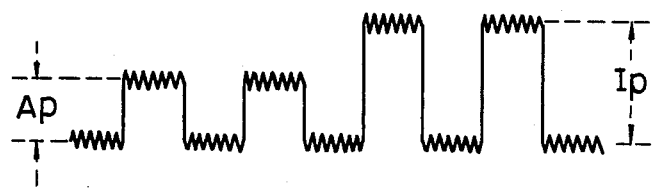
FIGS. 8A through 8G are signal waveforms showing the operation of the reproduction apparatus of the first embodiment.
Figure 8B:
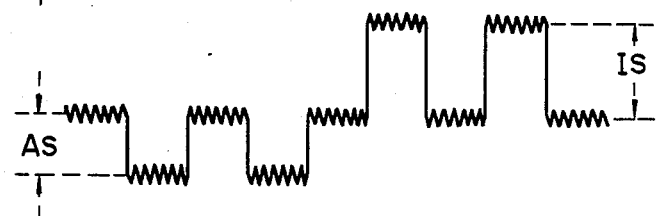
Figure 8C:
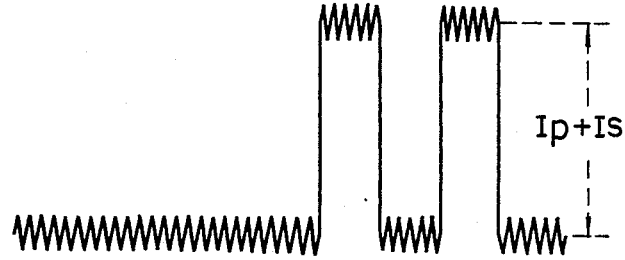
Figure 8D:
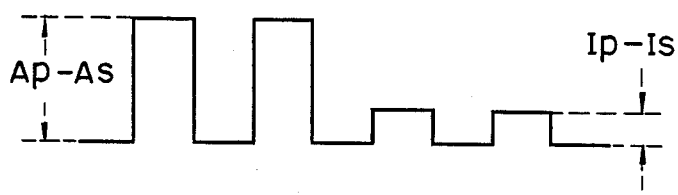
Figure 8E:
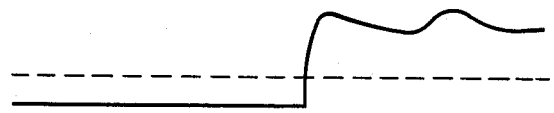
Figure 8F:

The operation of the first embodiment will be explained below with reference to FIGS. 8A through 8G. The output signal a of photodiode 13a, output signal b of photodiode 13b, output signal c of adder 15 and output signal d of subtracter 16 are the same as in the conventional arrangement and are shown in FIGS. 8A through 8D. Integrating circuit 32 integrates signal c to produce an integrating output f as shown in FIG. 8E. A reference signal from reference signal generator 34 is as indicated by a broken line in FIG. 8E. Since the signal c has a higher pulse amplitude when the pre-pit section (optical recording section) is reproduced, the output signal g of bi-level quantization circuit 33 is, as shown in FIG. 8F, at a "0" level when the data recording section (magneto-optical recording section) is reproduced and at a "1" level when the pre-pit section is reproduced.

Figure 8G:
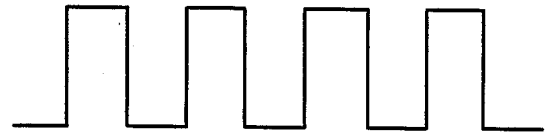

Gain control circuit 35 produces a gain control signal which can vary an amplification factor of the signal d by an output signal g of bi-level quantization circuit 33. The gain control signal controls the amplification factor of the signal d to permit the amplitude of a pulse from the data recording section which is contained in that signal to be equal to the amplitude of a pulse from the pre-pit section. That is, only the reproduction signal from the pre-pit section is amplified by an amount corresponding to a ratio d1/d2 of a pulse amplitude d1 (Ap−As) of a signal, to a pulse amplitude d2 (Ip−Is) thereof, which has initially been evaluated. In this way an output signal h1 of variable gain amplifier 36 is as shown in FIG. 8G.

As set forth above, according to this embodiment identification is made as to whether a reproduction signal is derived from the pre-pit section in which the address data is optically recorded, or from the data recording section in which the data is magneto-optically recorded, and then the amplification factor of the reproduction signal is made variable as a result of the identification. In this way the pulse amplitudes of both the signals are great enough for conversion to a binary representation and can be made substantially equal to each other. Even if both the signals are processed on a common signal processing circuit, a highly exact information can be reproduced without degenerating the S/N ratio.

In the first embodiment, gain control circuit 35 is not always essential. For example, the gain of variable gain amplifier 36 may be controlled by an output g of bi-level quantization circuit 33. Variable gain amplifier 36 may be replaced by an attenuator so long as the gain can be controlled relatively. As a signal for making identification as to whether or not a reproduction signal now under consideration is derived from the magneto-optical recording information or from the other recording information, use may be made of, in addition to the output c of adder 15, outputs a and b of photodiodes 13a and 13b and output d of subtracter 16.

Figure 9:
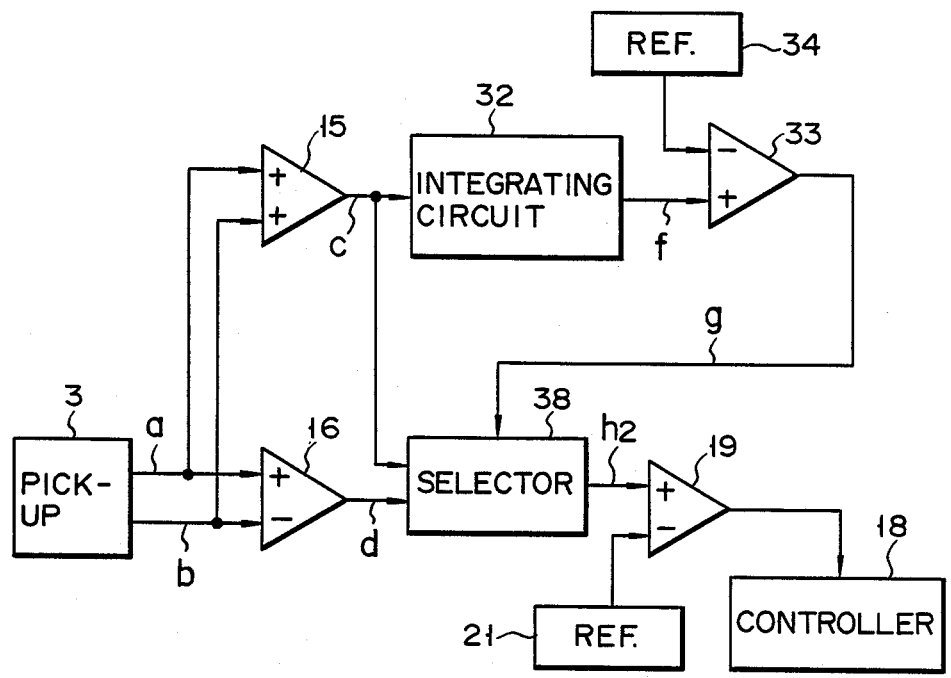
FIG. 9 is a block diagram showing a signal processing circuit in a reproduction apparatus for a magneto-optical recording medium according to a second embodiment of this invention.

FIG. 9 is a block diagram showing a signal processing circuit in a second embodiment of this invention. In this embodiment, selector 38 is provided in place of variable gain amplifier 36 of the first embodiment and receives an output c of adder 15 and output d of subtracter 16. The output g of bi-level quantization circuit 33 for converting an output f of integrating circuit 32 to a bi-level signal is supplied to a control terminal of selector 38.

Figure 10:
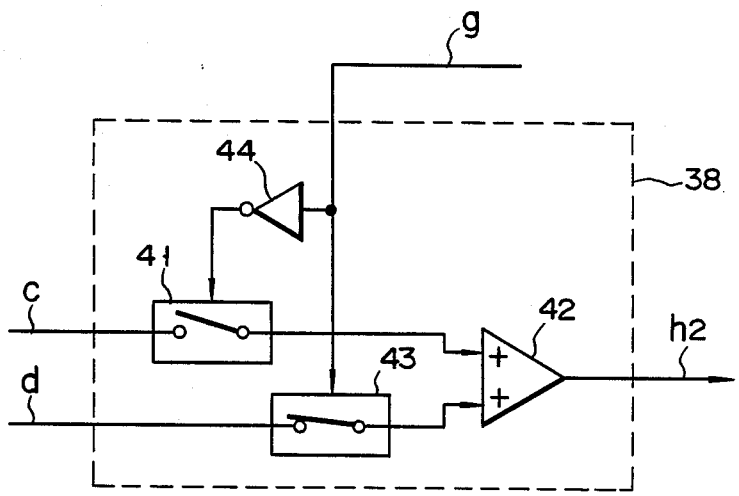
FIG. 10 is a block diagram of a selector of FIG. 8.

A detail of selector 38 is as shown in FIG. 10. Signals c and d are supplied respectively through analog switches 41 and 43 to adder 42. The output signal of adder 42 in the selector is supplied as an output h2 to bi-level quantization circuit 19. The output g of bi-level quantization circuit 33 is supplied directly to a control terminal of analog switch 43 and through inverter 44 to a control terminal of analog switch 41. Analog switches 41 and 43 are turned ON when their control terminals are at a "0" level and turned OFF when their control terminals are at a "1" level. For this reason, when the signal g is at the "0" level, analog switch 43 is turned ON to permit the signal d to be output from selector 38. When the signal g is at the "1" level, analog switch 41 is turned ON to permit the signal c to be output from selector 38.

The operation of the second embodiment is shown in FIGS. 11A to 11G. The output signal a of photodiode 13a, output signal b of photodiode 13b, output signal c of adder 15 and output signal d of subtracter 16, output f of integrating circuit 32 and output g of bi-level quantization circuit 33 are as shown in the first embodiment and shown in FIGS. 11A to 11F. Selector 38 delivers signal d or signal c in accordance with the signal g. The signal g is at the "0" level during reproduction on the data recording section and at the "1" level during reproduction on the pre-pit section. For this reason, selector 38 delivers the signal d during reproduction on the data recording section and signal c is delivered during reproduction on the pre-pit section. The output signal h2 of selector 38 is as shown in FIG. 11G.

According to the second embodiment, selector 38 selects the output signal c of adder 15 which is greater in noise level and in amplitude of its optical recording signal component than the magneto-optical recording signal component, or output d of subtracter 16 which is free from noises but much smaller in amplitude of its optical recording signal component than the magnetooptical recording signal component. Therefore, the reproduction signal of optical recording information and that of magneto-optical recording information can be made great enough in amplitude for bi-level quantization and hence a highly accurate information can be reproduced without degenerating the S/N ratio even if both the signals are processed on a common signal processing circuit. Since the signals of the data recording section and pre-pit section are supplied to bi-level quantization circuit 19 without any interference, there is no possibility that an error will be produced due to noises contained in the data from the pre-pit section upon bi-level quantizing the data from the recording section, or that an error will be produced due to noises contained in the data from the recording section upon bi-level quantizing the data from the pre-pit section.

The amplitudes of the reproduction pulse from the data recording section and the reproduction pulse from the pre-pit section may be equal to each other depending on the combination of the material of the disk and the recording principle. If these amplitudes are different from each other, they can be made substantially equal to each other by varying the gain of adder 15 or subtracter 16.

FIG. 12 is a block diagram showing an arrangement of a signal processing circuit in a third embodiment of this invention. The third embodiment is an improvement over the second embodiment and implemented by adding reset circuit 53 to integrating circuit 32 of the second embodiment. Integrating circuit 32, upon detecting data on the pre-pit section, produces a high level output, but it is necessary that during a shift from the reproduction of the data on the pre-pit section to the reproduction of the data on the data recording section the output of integrating circuit 32 be rapidly returned to a low level. For this reason, an output d of subtracter 16 is input to integrating circuit 52 and an output of integrating circuit 52 is supplied through bi-level quantization circuit 54 to one-shot multivibrator 56. Here reference level 55 of bi-level quantization circuit 54 is set greater than the amplitude Ip—Is of a pulse signal on the pre-pit section as shown in FIG. 11D. The output of one-shot multivibrator 56 is supplied to a reset terminal of integrating circuit 32. Integrating circuit 52, bi-level quantization circuit 54 and one-shot multivibrator 56 constitutes reset circuit 53, noting that the rest of the circuit arrangement is the same as the second embodiment.

According to the third embodiment, one-shot multivibrator 56, upon a shift from a low to a high level on the output of bi-level quantization circuit 54 (upon detecting the reproduction of the magneto-optical recording information), delivers a reset pulse of a predetermined width to integrating circuit 32. In this way, the output of integrating circuit 32 becomes zero and thus the integrating circuit 32 is cleared. For this reason, when a shift is made from a reproduction on the pre-pit section to a reproduction on the recording section, a rapid switching is performed on selector 36 to permit the output d of subtracter 16 to be supplied to bi-level quantization circuit 19.

FIG. 13 is a circuit diagram of a fourth embodiment. This embodiment aims to detect the amplitudes d1 and d2 of the reproduction pulse signal for each disk. In the first embodiment, the gain of the variable gain amplifier 36 is controlled in accordance with the preset ratio of the amplitude d1/d2. However, the amplitudes d1 and d2 of disks may be different from each other. Therefore, the fourth embodiment detects the amplitudes d1 and d2 during the initial period before the reproduction operation and controls the gain of the amplifier 36 in accordance with the detected value d1 and d2 during the reproduction operation.

The output signal h1 of variable gain amplifier 36 is supplied to peak hold circuit 35. Peak hold circuit 356 envelop-detects the output signal h1 of variable gain amplifier 36. The output from the circuit 356 is supplied to latch circuits 351 and 352 through inverter amplifier 357 and analog to digital (A/D) converter 358. The output data of converter 358 is latched in latch circuits 351 and 352 in response to outputs of AND gates 359 and 360.

The output data of the latch circuits 351 and 352 are supplied to the first and second input terminals of data selector 353. A latch circuit 354 which stores the preset data representing the gain of amplifier 36 at the initial period is also connected to the third input terminal of selector 353.

The output signal g from the subtracter 33 is supplied to the first control terminal of selector 353 through a switch SW. An initialize pulse in supplied to the second control terminal of selector 353 and the control terminal of switch SW. The output data of selector 353 is supplied to digital to analog (D/A) converter 355 and whose output signal is then supplied to the gain control terminal of amplifier 36.

The initialize pulse is supplied to the first input terminals of AND gates 359 and 360. Index pulse from an index detector (not shown) is supplied to the second input terminal of the AND gate 359 through delay circuits 361 and 362. The output of the delay circuit 361 is supplied to the second input terminal of the AND gate 360.

The operation of the fourth embodiment will be described. It is assumed that the disk has a special track for detection of the amplitudes d1 and d2. If an arbitrary track is used to detect the amplitudes of the pulse, it is not possible to detect the amplitude d1 of the reproduction pulse from the data recording portion when the data is not recorded at all. The data recording portion of the special track is filled with data such as a repetition data 1, 0, 1, 0, ... The pre-pit portion of the special track may be the same as that of the usual track.

At the initial period before the reproduction operation, the initialize pulse is set to a "1" level, as shown in FIG. 14A. Data selector 353 selects the output of latch circuit 354. The "1" level initialize signal opens switch SW. AND gates 359 and 360 can be conductive upon the index pulse output from delay circuits 362 and 361. Therefore, the gain of amplifier 36 is controlled in accordance with the output data of latch circuit 354 through selector 353 and D/A converter 355. The preset data of latch circuit 354 represents the gain of amplifier 36 which does not make the output of amplifier increase or decrease too much.

The output of amplifier 36 whose gain is controlled is envelope-detected by peak hold circuit 356. Therefore, the output of peak hold circuit 356 represents the average value of the amplitude of the reproduction pulse d.

The outputs of AND gates 359 and 360 becomes a "1" level when the outputs of delay circuits 362 and 361 becomes a "1" level. The disk has an index mark to produce the index pulse per one revolution of the disk. The index mark has a different optical or magnetic characteristic. The relationship between the index mark and the pre-pit portion and the relationship between the index mark and the data recording portion are generally fixed. Therefore, the amplitude d1 of the reproduction pulse from the data recording portion and the amplitude d2 of the reproduction pulse from the pre-pit portion can be latched in latch circuits 351 and 352 if the delay times t1 and t2 of the delay circuits 361 and 362 are suitably set. The delay time t1 of delay circuit 361 is set according to the difference between the index mark and the pre-pit portion, as shown in FIG. 14C. The delay time t2 of delay circuit 362 is set according to the difference between the index mark and the data recording portion, as shown in FIG. 14D.

Therefore, the large sample data corresponding to the amplitude of the reproduction pulse from the pre-pit portion is latched in the latch circuit 352 and the small sample data corresponding to the amplitude of the reproduction pulse from the data recording portion is latched in the latch circuit 351.

After the initialize operation period, the initialize pulse becomes a "0" level then the output of the AND gates 359 and 360 becomes a "0" level. Therefore, the output of A/D converter 358 is inhibited from being latched in the latch circuits 351 and 352. In this way, the detected amplitudes d1 and d2 are stored in the latch circuits 351 and 352 during the reproduction operation period.

During the reproduction operation, switch SW is closed and data selector 353 selectively outputs the data from latch circuits 351 and 352 in accordance with the output signal g from subtracter 33 through the switch SW. That is, the stored data d1 from latch circuit 351 is selected if the signal g is a "0" level, that is, the data recording portion is reproduced. While, the stored data d2 from latch circuit 352 is selected if the signal g is a "1" level, that is, the pre-pit portion is reproduced. Therefore, the gain of amplifier 36 is inversely proportional to the amplitudes of the pulse and the output pulse can have a constant amplitude.

According to this invention, when a reproduction is made from the magneto-optical recording medium with information recorded on the magneto-optical recording format and a format other than the magneto-optical recording format, even if the reproduction signal for the magneto-optical recording information and the reproduction signal for the other information are processed on a common signal processing circuit, a reproduction apparatus for a magneto-optical recording medium can be provided which can reproduce information with a higher S/N ratio.

What is claimed is:

1. A reproduction apparatus for a magneto-optical recording medium, comprising:
   pick-up means for obtaining either of in-phase and opposite phase reproduction signals in response to a light beam reflected from a magneto-optical recording medium;
   signal processing means including two different signal processing systems coupled to said pick-up means for processing the reproduction signals in a selected one of two different modes; and
   means associated with said signal processing means for identifying whether reproduction signals obtained from the magneto-optical recording medium are opposite phase signals corresponding to magneto-optical recording information or in-phase signals corresponding to information other than magneto-optical recording information, and for selecting a corresponding signal processing system.

2. A reproduction apparatus according to claim 1, in which said signal processing means includes means for delivering either one of an addition signal and a subtraction signal of P- and S-axis components of said reproduction signal in accordance with the output of said identifying means, in which said subtraction signal is output when a reproduction signal obtained by said pick-up means is identified as one corresponding to magneto-optical recording information, and said addition signal is output when a reproduction signal obtained by said pick-up means is identified as a signal corresponding to information other than magneto-optical recording information.

3. A reproduction apparatus according to claim 1, further comprising comparator means for converting an output signal of said signal processing means into a binary signal for further processing.

4. A reproduction apparatus for a magneto-optical recording medium containing magneto-optical recording information and optical recording information, comprising:
   means for directing a linearly polarized laser beam onto the magneto-optical recording medium;
   means for detecting P- and S-axis components of said linearly polarized laser beam reflected on said magneto-optical recording medium, said components forming a reproduction signal when combined with one another;
   means for adding said P- and said S-axis components to obtain an addition signal;
   means for obtaining a subtraction signal of said and said S-axis components;
   means responsive to a combination of said P- and said S-axis components for identifying whether the axis components detected by said detecting means correspond to magneto-optical recording information or to optical recording information, and for producing a corresponding output; and
   means for selecting one of the addition signal and the subtraction signal in accordance with the output of said identifying means, in which said subtraction signal is output when axis components corresponding to magneto-optical recording information are identified, and said addition signal is output when axis components corresponding to information other than magneto-optical recording information are identified.

5. A reproduction apparatus according to claim 4 in which said identifying means includes means responsive to said addition signal of said P- and S-axis components to produce said output.

6. A reproduction apparatus according to claim 5, in which said identifying means further includes means for integrating said addition signal to form an integration signal, and means to permit identification to be performed based on said integration signal.

7. A reproduction apparatus according to claim 6, in which said integrating means is reset when said reproduction signal of magneto-optical recording information is detected.

8. A reproduction apparatus according to claim 5, further comprising comparator means for converting an output signal of said signal selecting means into a binary signal for further processing.

* * * * *

UNITED STATES PATENT AND TRADEMARK OFFICE
CERTIFICATE OF CORRECTION

PATENT NO. : 4,833,662

DATED : May 23, 1989

INVENTOR(S) :

It is certified that error appears in the above-identified patent and that said Letters Patent is hereby corrected as shown below:

On the title page:

IN THE ABSTRACT

Line 9, "confines" should be -- combines --

Line 21, "of" should be -- for --

"for" should be -- of --

Signed and Sealed this

Twenty-second Day of May, 1990

Attest:

HARRY F. MANBECK, JR.

*Attesting Officer*      *Commissioner of Patents and Trademarks*